United States Patent [19]

Yokota et al.

[11] Patent Number: 4,661,053
[45] Date of Patent: Apr. 28, 1987

[54] PLASTIC MAGNET INJECTION MOLDING MACHINE

[75] Inventors: Akira Yokota; Masashi Kato, both of Hiroshima, Japan

[73] Assignee: The Japan Steel Works Ltd., Japan

[21] Appl. No.: 717,773

[22] Filed: Mar. 29, 1985

[30] Foreign Application Priority Data

Mar. 30, 1984 [JP] Japan ............................ 59-45046[U]

[51] Int. Cl.$^4$ ............................................ B29C 33/32
[52] U.S. Cl. ......................................... 425/3; 264/24;
264/108; 264/DIG. 58; 425/174.8 R; 425/190;
425/DIG. 33
[58] Field of Search ................. 264/24, 108, DIG. 58;
425/3, 174.8 R, DIG. 33, 190, 547, 542;
164/443

[56] References Cited

U.S. PATENT DOCUMENTS

| | | | |
|---|---|---|---|
| 3,555,621 | 1/1971 | Hara | 425/3 |
| 4,150,712 | 4/1979 | Dussart | 164/443 |
| 4,441,875 | 4/1984 | Saito et al. | 425/3 |
| 4,540,359 | 9/1985 | Yamazaki | 425/547 |

Primary Examiner—Jay H. Woo
Assistant Examiner—Timothy W. Heitbrink
Attorney, Agent, or Firm—Sughrue, Mion, Zinn, Macpeak, and Seas

[57] ABSTRACT

A plastic magnet injection molding machine comprises a stationary platen side and a movable platen side block each made of a ferromagnetic material and fixed to or integrated with a stationary and a movable platen, a stationary platen side and a movable platen side exciting coil arranged at the outer circumferences of respective ferromagnetic blocks, and a stationary platen side and a movable platen side cover each made of a non-magnetic material and attached to respective platens so as to surround the outer circumferences of the respective exciting coil and ferromagnetic block. The stationary platen side ferromagnetic block and non-magnetic cover have, respectively, surfaces each being in opposition to the movable platen and being flush with each other in a single plane parallel with the stationary platen. The movable platen side ferromagnetic block and non-magnetic cover have, respectively, surfaces each being in opposition to the stationary platen and being flush with each other in a single plane parallel with movable platen. Both of the single planes are formed with bolt holes for fitting stationary and movable molds, respectively.

3 Claims, 5 Drawing Figures

PLASTIC MAGNET INJECTION MOLDING MACHINE

BACKGROUND OF THE INVENTION

The present invention relates to a plastic magnet injection molding machine.

In the case of injection molding an anisotropic plastic magnet, a magnetic field has to be applied in the molding process. The conventional plastic magnet injection molding machines can be classified into two types according to the methods used to apply magnetic fields. That is, one is a type in which an exciting coil for producing a magnetic field is incorporated within a mold and the other is a type in which an exciting coil is arranged at the outer circumference of each of a stationary and a movable platen of a mold tightening device.

There are disadvantages in the type incorporating the exciting coil within the mold. That is, in order to incorporate the exciting coil into the mold, a space is necessary, so that the mold becomes correspondingly large, and it becomes necessary to use a large sized injection molding machine. In the case of a mold for simultaneously molding a number of products, the yield is reduced and the producibility is lowered.

On the other hand, in the type surrounding the stationary and movable platens with exciting coils, there are disadvantages as follows. That is, since the exciting coils are arranged respectively at the outer circumferences of the stationary and movable platens, the device becomes complicated and large in size. Besides, it has been necessary to remove the exciting coil every cycle whenever the molded products are taken out, so that it has been difficult to improve the efficiency in production.

SUMMARY OF THE INVENTION

An object of the present invention is to provide a plastic magnet injection molding machine in which a plastic magnet may be effectively molded with no exciting coil provided within the mold, without increasing the size of the mold, and without being complicated.

The object of the present invention can be attained in such a manner that a block made of ferromagnetic material and provided with an exciting coil at the outer circumference is surrounded by a cover made of a non-magnetic material, and the non-magnetic material cover and the ferromagnetic block are arranged to make it possible to fit a mold on one end surface thereof. That is, according to the present invention, the plastic magnet injection molding machine comprises: a stationary platen side and a movable platen side block each made of a ferromagnetic material and respectively fixed to or integrated with a stationary and a movable platen; a stationary platen side and a movable platen side exciting coil arranged at the respective outer circumferences of the stationary platen side and movable platen side ferromagnetic blocks; a stationary platen side and a movable platen side cover each made of a non-magnetic material and respectively attached to the stationary and movable platens so as to surround the respective outer circumferences of the stationary platen side exciting coil and the stationary platen side ferromagnetic block and the respective outer circumferences of the movable platen side exciting coil and the movable platen side ferromagnetic block; the stationary platen side ferromagnetic block and the stationary platen side non-magnetic cover respectively having surfaces each being in opposition to the movable platen and being flush with each other in a single plane parallel with the stationary platen; the movable platen side ferromagnetic block and the movable platen side non-magnetic cover respectively having surfaces being in opposition to the stationary platen and being flush with each other in a single plane parallel with the movable platen and both of the single planes being formed with bolt holes for fitting stationary and movable molds,

DESCRIPTION OF THE PREFERRED EMBODIMENTS

Referring to FIGS. 1, 1A, 2, 3 and 3A of the accompanying drawings, an embodiment according to the present invention will be described hereunder.

Figure 1:
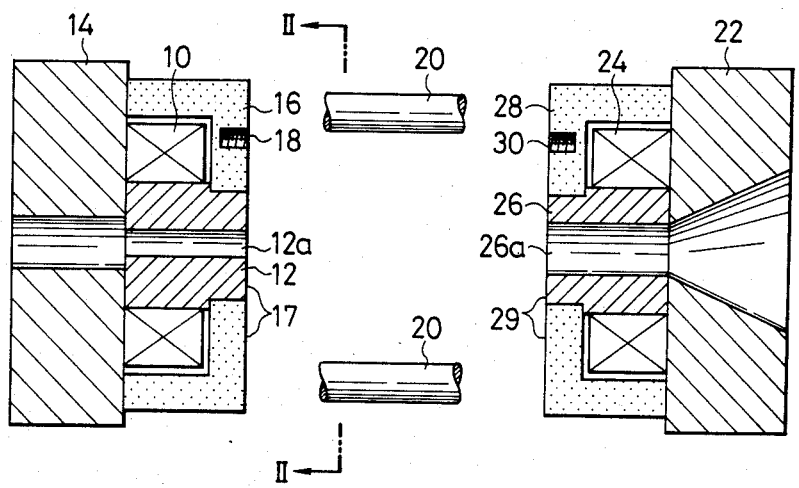
FIG. 1 is a diagram showing a plastic magnetic injection molding machine according to the present invention.
Figure 1A:
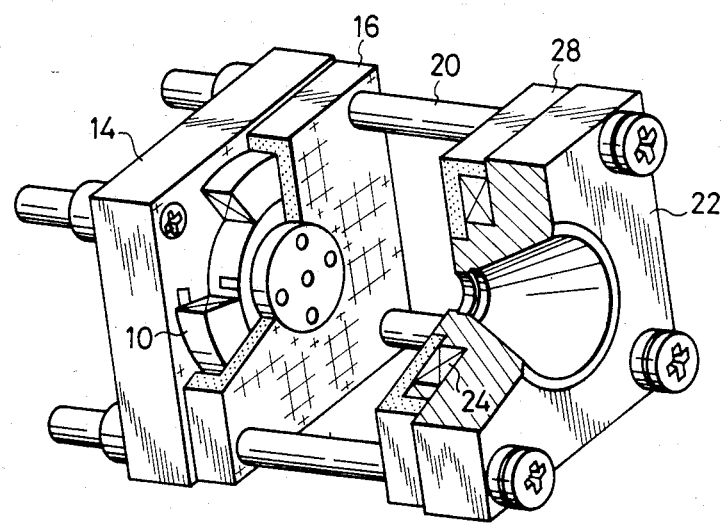
FIG. 1A is a perspective view of the machine.
Figure 2:
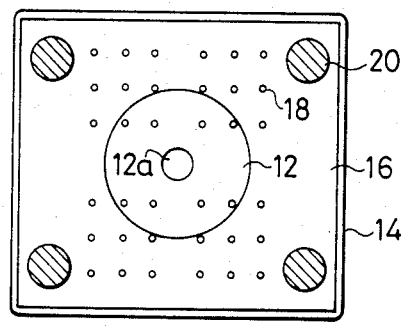
FIG. 2 is a diagram as viewed from the line II—II in FIG. 1.

A movable platen side block 12 made of a ferromagnetic material (for example, ferromagnetic steel) and provided with a movable platen side exciting coil 10 at the outer circumference thereof, is fixed to a movable platen 14 at the central portion thereof. A movable platen side cover 16 made of a non-magnetic material (for example, non-magnetic steel) is fixed on the movable platen 14 so as to surround the respective outer circumferences of the movable platen side exciting coil 10 and the movable platen side ferromagnetic block 12. The surfaces of the movable platen side ferromagnetic block 12 and the movable platen side non-magnetic cover 16 opposite the surfaces attached to the movable platen 14 are made to be flush with each other in a single plane 17 as best shown in FIGS. 1 and 1A. That is, the movable platen side ferromagnetic block 12 and the movable platen side non-magnetic cover 16 are made equal in thickness. As shown in FIG. 2, a plurality of movable mold fitting bolt holes 18 are formed in the above-mentioned single plane 17 constituted by the movable platen side ferromagnetic block 12 and the movable platen side non-magnetic cover 16. It is possible to fit a mold of a desired size, without interference with tie bars 20, by using the movable mold fitting bolt holes 18.

Also with respect to a stationary platen 22, there are provided a stationary platen side exciting coil 24, a stationary platen side block 26 made of ferromagnetic material and a stationary platen side cover 28 made of non-magnetic material, which are arranged in the same manner as the movable platen 14 side, and the surfaces of the stationary platen side ferromagnetic block 26 and the stationary platen side non-magnetic cover 28 opposite the surfaces attached to the stationary platen 22 are made to be flush with each other in a single plane 29 in which stationary mold fitting bolt holes 30 are formed. This arrangement is basically the same as that in the movable platen 14 side, but it is different only in that the diameter of a nozzle admission hole 26a in the stationary platen side ferromagnetic block 26 is larger than that of an ejector rod hole 12a in the movable platen side ferromagnetic block 12.

Figure 3:
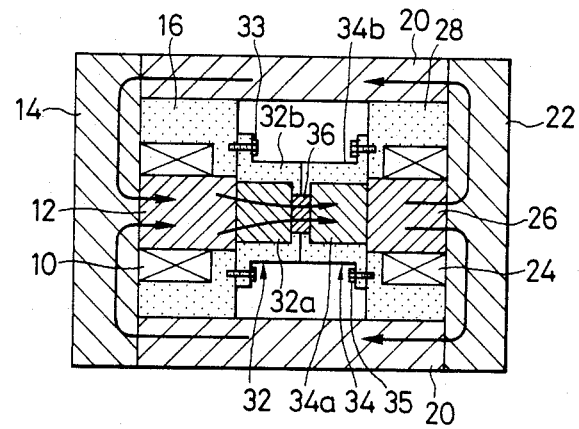
FIG. 3 is a diagram generally showing a flow of magnetic flux.
Figure 3A:
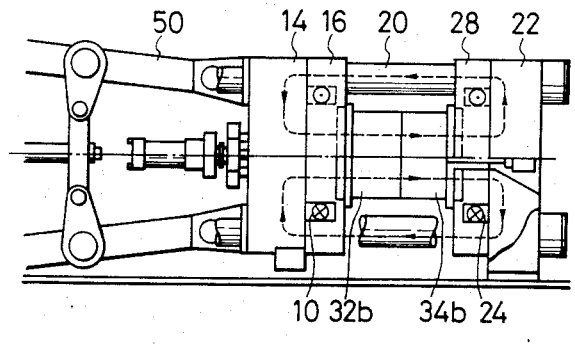
FIG. 3A is a side elevational view of the machine using a mold tightening mechanism, showing the magnetic flux flow.

FIGS. 3 and 3A show briefly the state in which mold tightening is performed and a magnetic field is generated. That is, a movable mold 32 is fixed to the movable platen side non-magnetic cover 16 with bolts 33, and a stationary mold 34 is fixed to the stationary platen side non-magnetic cover 28 with bolts 35. Both the molds are secured to each other by a mold-tightening mechanism 50 as shown in FIG. 3A. The movable mold 32 is constituted by a portion made of a ferromagnetic material 32a and a portion made of a non-magnetic material 32b, and the stationary mold 34 is also constituted by a portion made of a ferromagnetic material 34a and a portion made of a non-magnetic material 34b.

When a current is caused to flow in the movable platen side exciting coil 10 and the stationary platen side exciting coil 24 with the mold tightened, a magnetic flux flow produced thereby passes in the ferromagnetic portion. That is, a closed magnetic path is formed from the stationary platen 22 to the same through the tie bars 20, the movable platen 14, the movable platen side ferromagnetic block 12, the ferromagnetic portion 32a of the movable mold 32, a cavity 36 between the movable mold 32 and the stationary mold 34, the ferromagnetic portion 34a of the stationary mold 34, the stationary platen side ferromagnetic block 26, and the stationary platen 22.

In this way, the magnetic powder being molded in the cavity 36 can be orientated by the magnetic field. Since the magnetic flux flow forms a completely closed magnetic path, it is possible to cause the magnetic field to act effectively in the cavity 36. Besides, in the plastic magnet injection molding machine, the movable platen 14 and the stationary platen 22 increase only in dimension of their thickness. As can be seen, the space is effectively used without increasing the size of the mold-tightening mechanism. The fitting/detaching of the movable mold 32 and the stationary mold 34 can readily be performed as in an ordinary injection molding machine. Of course, it becomes unnecessary to incorporate the exciting coil into the mold, so that the design of the mold becomes easy and the cost of the mold can be reduced. Further, it may be used as an ordinary injection molding machine under the condition that no current is caused to flow in the movable platen side exciting coil 10 and the stationary platen side exciting coil 34.

Although the movable base side ferromagnetic block 12 is separately provided from the movable platen 14 and attached to the movable platen 14, the movable platen side ferromagnetic block 12 and the movable platen 14 may be formed integrally with each other. Further, the stationary platen side ferromagnetic block 26 and the stationary platen 22 may be formed integrally with each other. In the case where an ordinary molding machine is modified for processing a plastic magnet, the separate ferromagnetic blocks 12 and 26 are mounted on the stationary and movable platens 14 and 22, respectively.

As described above, according to the present invention, it becomes possible to perform a plastic magnet injection molding in the same manner as an ordinary injection molding machine without increasing in size and without being complicated. Therefore, it is possible to perform molding with the same rapid molding cycle as in the ordinary injection molding machine, and it becomes easy in design, manufacturing, etc., resulting in reduction in cost.

We claim:

1. A plastic magnet injection molding machine comprising: a stationary platen side block and a movable platen side block each of said side blocks made of a ferromagnetic material and having an outer circumference and each of said side blocks fixed, respectively, to a stationary platen and a movable platen; a stationary platen side coil and a movable platen side exciting coil arranged at the respective outer circumferences of said stationary and movable platen side ferromagnetic blocks; and a stationary platen side cover and a movable platen side cover each made of a non-magnetic material and attached, respectively, to said stationary and movable platens so as to surround the respective outer peripheries of said stationary platen side exciting coil and said stationary platen side ferromagnetic block and the respective outer peripheries of said movable platen side exciting coil and said movable platen side ferromagnetic block; wherein said stationary platen side ferromagnetic block and said stationary platen side non-magnetic cover have, respectively, surfaces each being in opposition to said movable platen and being flush with each other in a single plane parallel with said stationary platen and said movable platen side ferromagnetic block and said movable platen side non-magnetic cover have, respectively, surfaces each being in opposition to said stationary platen and being flush with each other in a single plane, said surfaces on said stationary and movable sides being formed with fastening holes for fitting stationary and movable molds, respectively.

2. The machine of claim 1, wherein said stationary and movable platen side blocks are formed integrally with said stationary and movable platens, respectively.

3. A plastic magnet injection molding machine comprising: a stationary platen side block and a movable platen side block each of said side blocks made of a ferromagnetic material and having an outer circumference and each of said side blocks fixed, respectively, to a stationary platen and a movable platen; a stationary platen side coil and a movable platen side exciting coil arranged at the respective outer circumferences of said stationary and movable platen side ferromagnetic blocks; and a stationary platen side cover and a movable platen side cover each made of a non-magnetic material and attached, respectively, to said stationary and movable platens so as to surround the respective outer peripheries of said stationary platen side exciting coil and said stationary platen side ferromagnetic block and the respective outer peripheries of said movable platen side exciting coil and said movable platen side ferromagnetic block; wherein said stationary platen side ferromagnetic block and said stationary platen side non-magnetic cover have, respectively, surfaces each being in opposition to said movable platen and being flush with each other in a single plane parallel with said stationary platen and said movable platen side ferromagnetic block and said movable platen side non-magnetic cover have, respectively, surfaces each being in opposition to said stationary platen and being flush with each other in a single plane, said surfaces on said stationary and movable sides being formed with fastening holes for fitting stationary and movable molds, respectively; said machine further comprising magnetic material tie rod means in contact with both of said stationary and movable platens whereby, with stationary and movable molds fitted to said surfaces on said stationary and movable sides and opposing one another to form a cavity containing a ferromagnetic material, a closed magnetic path is formed including said stationary platen, tie bar means, movable platen, movable platen side ferromagnetic block, movable mold, said ferromagnetic material contained in said cavity, said stationary mold and said stationary platen side ferromagnetic block.

* * * * *